United States Patent [19]

Sato

[11] Patent Number: 4,498,438

[45] Date of Patent: Feb. 12, 1985

[54] IGNITION TIMING CONTROL UNIT FOR A CAR ENGINE AND METHOD THEREOF

[75] Inventor: Kunihiko Sato, Okazaki, Japan

[73] Assignee: Toyota Jidosha Kabushiki Kaisha, Toyota, Japan

[21] Appl. No.: 587,976

[22] Filed: Mar. 9, 1984

[30] Foreign Application Priority Data

Jun. 24, 1983 [JP] Japan .................. 58-114471

[51] Int. Cl.$^3$ .................. F02P 5/04; F02D 37/02
[52] U.S. Cl. .................. 123/418; 123/416; 123/417
[58] Field of Search .............. 123/418, 416, 417, 424, 123/414, 478, 487, 480; 364/431.05, 431.04, 364/431.08

[56] References Cited

U.S. PATENT DOCUMENTS

| 4,367,531 | 1/1983 | Furuhashi et al. | 123/416 |
| 4,380,983 | 4/1983 | Kobushi et al. | 123/418 |
| 4,403,584 | 9/1983 | Suzuki et al. | 123/418 |
| 4,414,946 | 11/1983 | Däuoner et al. | 123/417 |
| 4,448,162 | 5/1983 | Ninomiya et al. | 123/418 |
| 4,448,171 | 5/1984 | Ninomiya et al. | 123/418 |

*Primary Examiner*—Raymond A. Nelli
*Attorney, Agent, or Firm*—Finnegan, Henderson, Farabow, Garrett & Dunner

[57] ABSTRACT

An ignition timing control unit for a car engine by use of a microprocessor having a CPU, A ROM, and a RAM and a plurality of sensors, each output of which is connected to the input of the microprocessor so as to detect various parameters about running conditions of the engine in which various operations and calculations, such as determining whether or not the current engine speed detected is larger than an averaged out value which was detected previously and which has been stored in the RAM, updating the old weighting averaged value stored in the RAM with a new weighting averaged value, calculating a delay angle amount to be corrected for a spark advance angle and an effective spark advance angle value, and controlling the output timing of the ignition current to be applied to the igniter are carried out in the CPU of the microprocessor, in accordance with particular control programs according to the present invention which have been stored in the ROM.

With this construction, an over control of the ignition timing due to the fluctuation in the engine speed which was met in the prior art can be prevented by the averaging processing of the engine speed and a suitable ignition timing control becomes possible, thus reducing shocks and "hiccups" which otherwise often occur at the time of the abrupt acceleration or deceleration.

6 Claims, 11 Drawing Figures

IGNITION TIMING CONTROL UNIT FOR A CAR ENGINE AND METHOD THEREOF

BACKGROUND OF THE INVENTION (1) Field of the Invention

The present invention relates to an ignition timing control unit for a motor vehicle or car engine, more particularly to an engine ignition timing control unit for a car, which controls an output timing for the ignition current to be sent to a spark plug by suitably correcting the spark advance angle in accordance with the averaging value of the engine speed and a method for controlling the ignition timing.

(2) Description of the Prior Art

In a large displacement manual transmission car, since the variation in the torque due to the manipulation of an accelerator is large, there were resulting problems of backlash in gears in a drive system or gears of a rotating portion of detecting means for engine speed or twisting of a propeller shaft becomes large when performing a rapid acceleration or deceleration, or shocks of the car due to deformation of a tire or tires thereof become large as well as transient vibrations of the car forward and backward, i.e. the known phenomena that the car exhibits repeated knocking vibrations (which phenomena is referred to hereinafter as a "hiccup phenomena") forward and backward as either the acceleration or deceleration operation performed becomes large, thus degradating the drivability.

Moreover, in a middle or small displacement engine manual transmission car as well, similar problems as described above have occurred of late, as the high output tendency of engines progresses, and, in addition, as a result of the provision of a lock-up mechanism to an automatic transmission car, which has been developed recently, the similar problems as those in the manual transmission car have occurred. For instance, in the case where the "hiccup phenomena" as described in the foregoing occurs, the engine speed, the value of spark advance angle (i.e. effective advance angle value) and the car speed before or after acceleration to the time elapsed become the ones as indicated by the dotted lines in FIGS. 5(a), (b) and (c) or in FIGS. 7(a), (b) and (c).

In order to overcome the above problems and drawbacks, a car having an ignition timing control unit has been proposed in which the leading edge of the transmission torque for transmitting the engine output to drive wheels of the car can be smoothed when the car speed is abruptly changed by making the ignition timing to be either advance angle or delay angle in accordance with the fluctuation or change in the engine speed, thus improving the drivability.

Since, however, a process for averaging the engine speed (which will be described later) is not carried out in the above ignition timing control unit according to the prior art, an excessive control is often carried out by the change in gears of a rotating portion of detecting means for detecting the engine speed or the backlash in the gears of a drive system, thus causing a problem that the ignition timing cannot be necessarily controlled accurately.

SUMMARY OF THE INVENTION

It is therefore a main object of the present invention to provide an ignition timing control unit for a car engine in which the ignition timing is temporarily delayed or advanced in acccordance with the backlash in the gears in the drive system and the twisting of a propeller shaft due to the change in torque at the time of rapid acceleration or deceleration or the change in the engine speed due to deformation of a tire or tires, so as to smooth the leading edge of the torque, thus enabling shocks and hiccup phenomena of the car to be reduced.

It is another object of the present invention to provide an ignition timing control unit for a car engine in which the value of the spark advance angle is corrected in accordance with the difference between the averaged out value of the engine speed and current engine speed and the output timing of the ignition current to be applied to the spark plug is controlled in accordance with the value of the spark advance angle thus corrected.

It is still another object of the present invention to provide an ignition timing control unit for a car engine in which a smooth rising edge of the torque of the car is realized at the time of abrupt acceleration or deceleration and shocks and hiccups which occurred at the time of the abrupt acceleration or the deceleration can be reduced.

It is yet still another object of the present invention to provide an ignition control unit for a car engine in which an over control of the ignition timing due to the fluctuation in the engine speed can be prevented by the averaging processing of the engine speed and a suitable ignition timing becomes possible.

It is yet further object of the present invention to provide an ignition control unit for a car engine in which a microprocessor having ROM and RAM is used for controlling the ignition timing of the engine.

It is yet further object of the present invention to provide a method for controlling the ignition timing of a car engine.

One of the features of the ignition control unit for a car engine according to the present invention, is characterized in that it comprises an operational control circuit for controlling the output timing of ignition current to be applied to a spark plug in accordance with a crank angle signal produced for every equal crank angle in synchronization with the rotation of a crank shaft; said operational control circuit further comprising;

engine speed detecting means for detecting the engine speed in accordance with the crank angle signal, memory means for storing averaged values of the engine speed, basic spark advance angle calculating means for calculating a basic spark advance angle value from running conditions of the engine, averaging means for newly carrying out an averaging process in accordance with the engine speed and an averaged value of the engine speed and after storing the result of the averaging process into said memory means as one averaged value of the engine speed and for updating said averaged value of the engine speed which has been stored in said memory means, and calculating means for calculating an amount to be corrected of the spark advance angle in accordance with the difference between the averaged value and the engine speed and for controlling the output timing of the ignition current in accordance with the amount thus corrected of the basic spark advance angle value by said amount to be corrected.

These and other objects, features and advantages of the present invention will be better understood from the following detailed description with reference to the accompanying drawings.

DESCRIPTION OF PREFERRED EMBODIMENT

Figure 1:
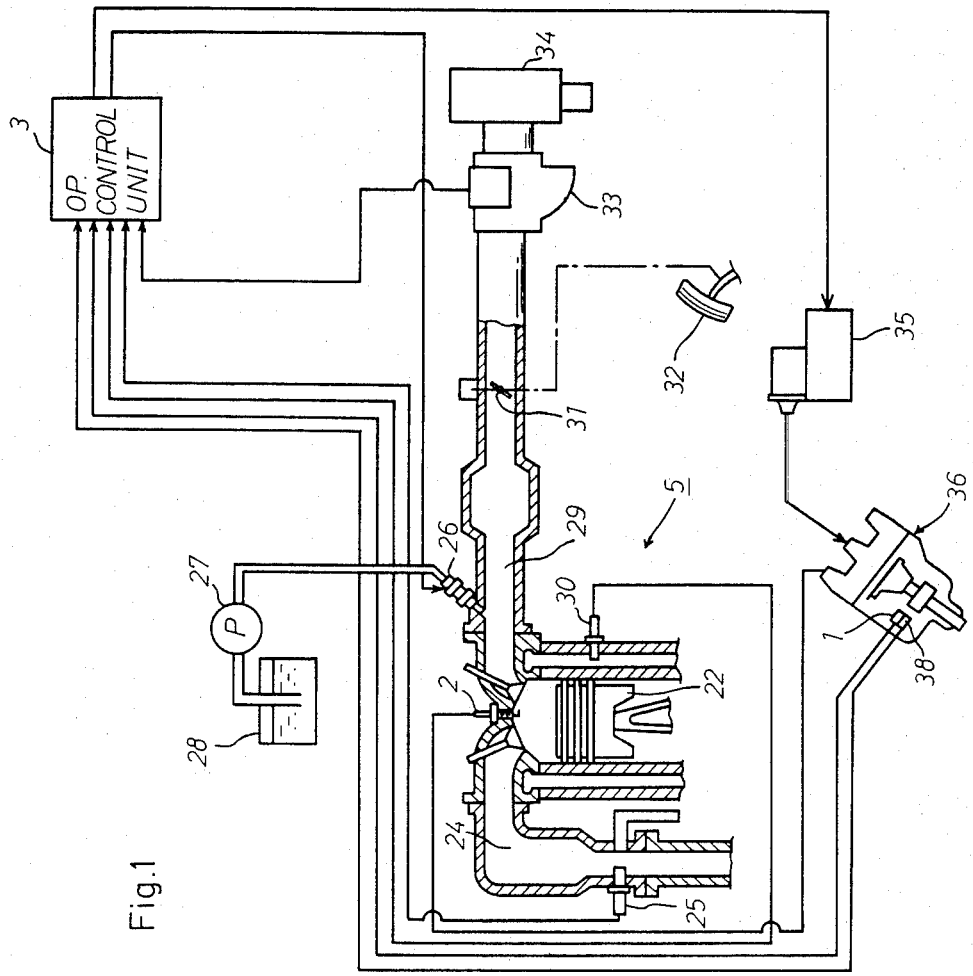
FIG. 1 illustrates an engine system having an engine and various elements and units as a peripheral system to which the present invention is applied.

Referring to FIG. 1, an engine system having an engine and various elements and units as a peripheral system as a whole to which the present invention is applied is shown. The engine system comprises a crank angle sensor 1, a spark plug 2, an operational control unit 3 according to the present invention, an engine 5, a piston 22, an exhaust manifold 24, an oxygen sensor 25 provided at the exhaust manifold 24 for detecting the remaining oxygen density among the exhaust gases, an fuel injection valve 26 which is provided at each cylinder for injecting fuel, a fuel pump 27 for supplying the fuel to the fuel injection valve, a fuel tank or reservoir 28, an intake manifold 29, a water temperature sensor 30 for detecting the cooling water temperature for the engine, a throttle valve 31, an accelerator pedal 32 for opening and closing the throttle valve, an air flow meter 33 for measuring or detecting the intake air flow, and an air cleaner 34 for purifying the intake air.

The engine system further comprises an igniter 35 having an ignition coil and for generating an high output voltage necessary for the ignition of the igniter, a distributor 36 which is interlocked with a crank shaft not shown and for distributing the high output voltage generated at the igniter 35 to the ignition plug 2 of each cylinder, and a cylinder identifying sensor 38 for identifying each cylinder and for producing one pulse signal for every revolution or rotation of the distributor 36.

The crank angle sensor 1 produces twenty four pulse signals for every one rotation of the distributor 36 or for every two rotations of the crank shaft. The operational control unit 3 performs operations and calculation of the signals produced from the air flow meter 33, the water temperature sensor 30, the crank sensor 1 and the cylinder identifying sensor 38 in accordance with its control programs and produces an control signal to the igniter 35.

Figure 2:
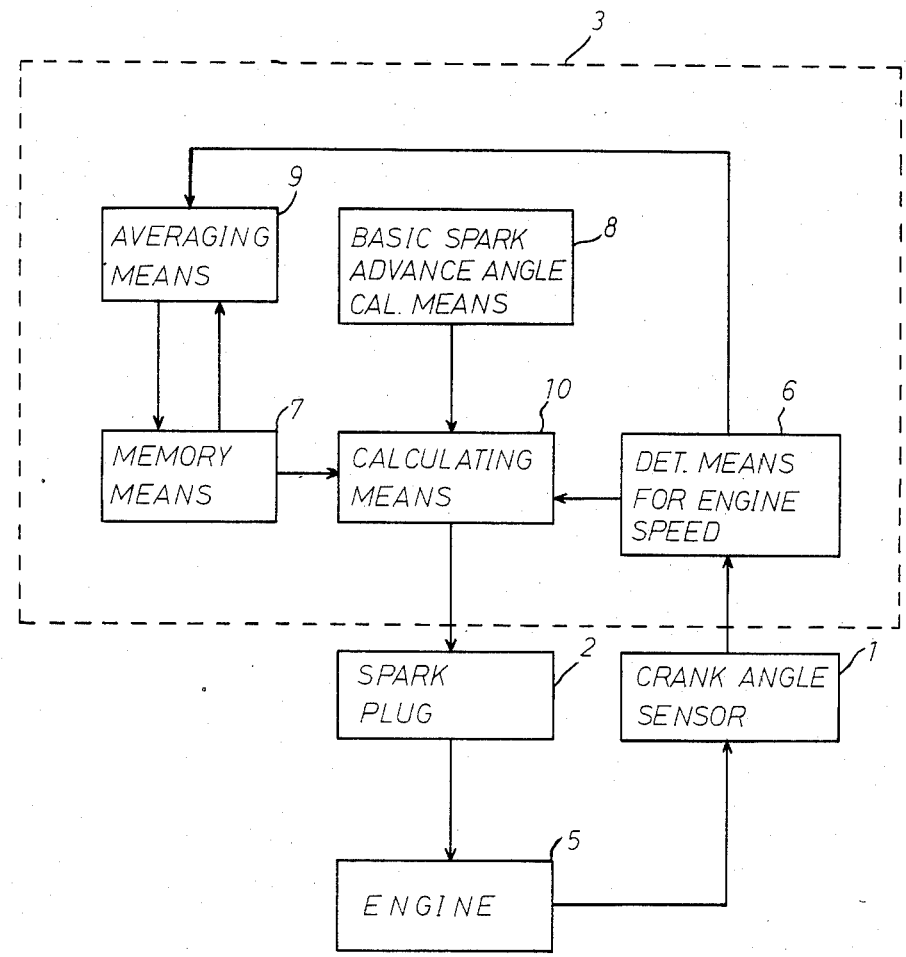
FIG. 2 illustrates a block diagram of an operational control unit according to the present invention.

FIG. 2 shows a detailed block diagram of the operational control unit 3 according to the present invention shown in FIG. 1. The operational control unit 3 comprises engine speed detecting means 6 for detecting the engine speed, memory means 7 for storing various data therein, a basic spark advance angle calculating means 8, averaging means 9, and calculating means 10 for operating and processing data in accordance with the control programs. And the output of engine speed detecting means 6 is connected to the input of averaging means 9 and calculating means 10, respectively. The output of memory means 7 is connected to the input of averaging means and calculating means respectively. And the output of basic spark advance angle calculating means is connected to the input of calculating means. The output of the averaging means is connected to the input of memory means. The output of the crank angle sensor 1 is connected to the input of engine speed detecting means 6, while the input of the spark plug 2 is connected to the output of calculating means 10.

Figure 3:
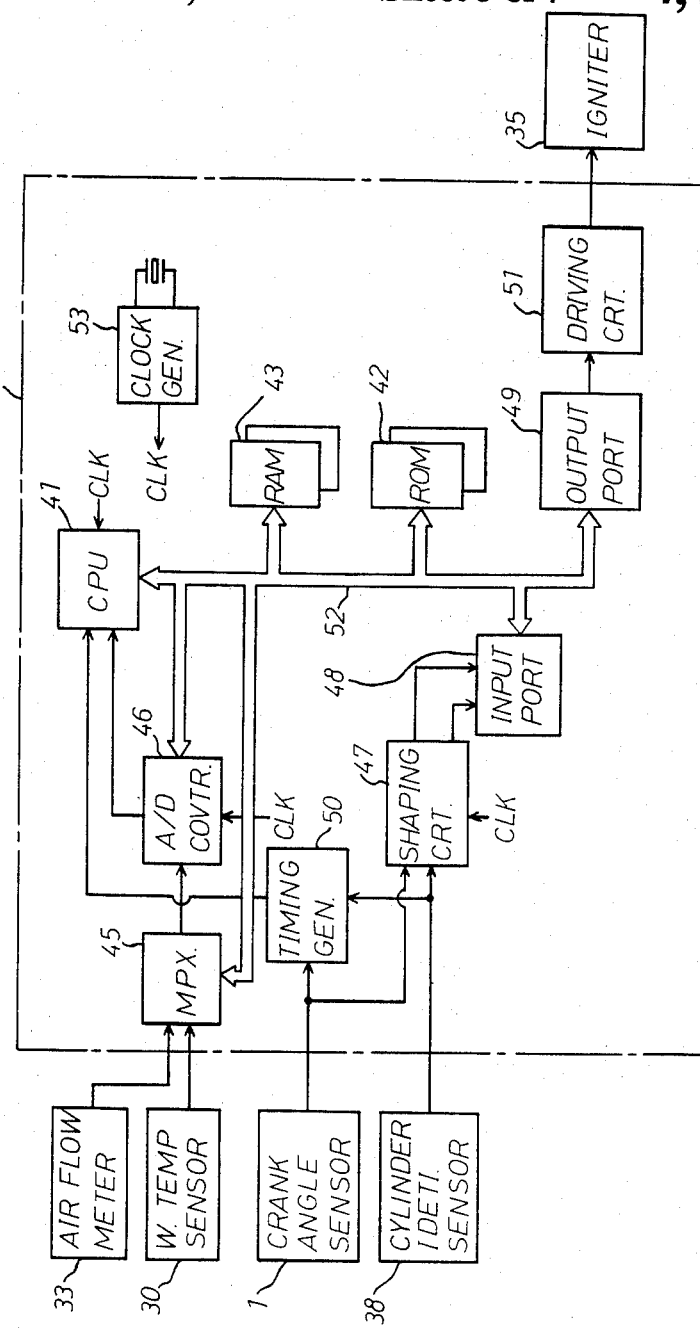
FIG. 3 illustrates a detailed block diagram of the operational control unit of FIG. 2, according to the present invention and its associated sensors and meter.

FIG. 3 shows a detailed block diagram of the operational control unit 3 according to the present invention which can be realized by use of a microprocessor. The operation control unit 3 comprises a CPU (central processing unit) 41 for carrying out various operations, a ROM (read only memory) 42 which is storing control programs and various initial data, a RAM (random access memory) 43 into which various data to be input to the operational control unit 3 are stored or any necessary data for carrying out operations and controls are temporarily read therefrom, a multiplexer 45 for selectively producing an output signal to the CPU 41 through an A/D converter (analog to digital converter) 46 which converts analog input signals into digital output signals, a wave shaping circuit 47 for carrying out the wave shaping of the input signals applied thereto, an input port 48, an output port 49, a timing generating circuit 50, a driving circuit 51, and a clock generating circuit 53.

The inputs of the multiplexer 45 are connected to the air flow meter 33 which is same as that shown in FIG. 1 and to the water temperature sensor 30 which is also shown in FIG. 1, respectively. The output of the crank angle sensor 1 is connected to the input of the timing generating circuit 50 which generates timing signals for executing the control programs for every thirty degrees (30°) in accordance with the output signals from the crank angle sensor 1 and from the cylinder identifying sensor 38 which is also connected to the input of the wave shaping circuit 47. The output from the timing generating circuit 50 is applied to the CPU 41.

The output of the crank angle sensor 1 is also connected to the other input of the wave shaping circuit 47. The output from the wave shaping circuit 47 are connected to the input port 48, respectively. The output of the output port 49 is connected to the input of the driving circuit 51 and the output of the driving circuit 51 is in turn connected to the input of the igniter 35 which is same as that shown in FIG. 1. The control signal from the CPU 41 is applied to the igniter 35 through the output port 49 and the driving circuit 51.

The clock generating circuit 53 generates clock signals to be applied to the A/D converter 46, to the wave shaping circuit 47, to the CPU 41 and so forth, so as to give suitable timings for operations and controls, respectively.

Bus line 52 communicates between the CPU 41, and the ROM 42, the RAM 43, and the A/D converter 46, the input port 48, and the output port 49 so that all data are transferred through the bus line 52 to each destination.

Figure 4:
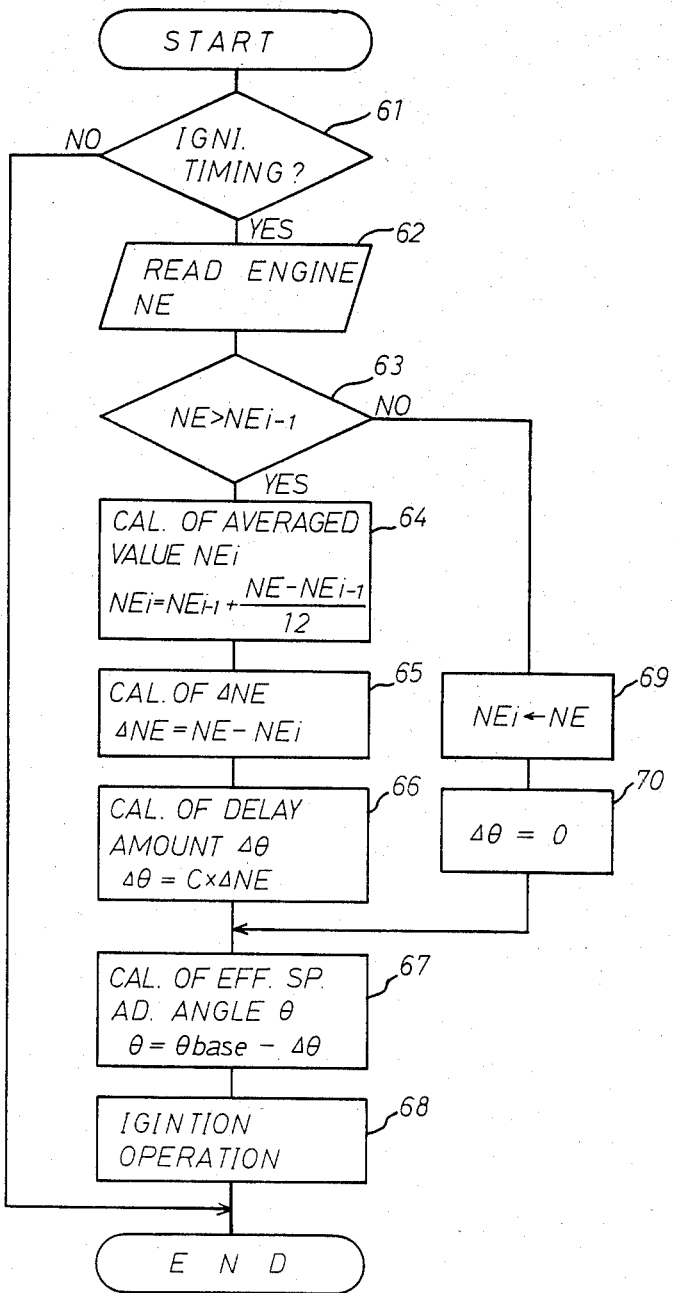
FIG. 4 illustrates a control program flow chart of a first embodiment according to the present invention for carrying out various operations and calculations.

FIG. 4 shows an control program flow chart in the form of a subroutine according to one embodiment of the present invention, which controls the operational control unit 3 shown in FIG. 3. This subroutine is repeatedly executed by the operational control unit 3 shown in FIG. 3 so as to carry out operations and calculations, in accordance with the timing signals produced by the timing generating circuit 50 for every thirty degrees.

Now, the operation of the operational control unit 3 in FIG. 3 will be described with reference to the subroutine shown in FIG. 4.

First of all, when starting the operation, the timing for carrying out the ignition is determined in the step 61. Namely, in the step 61, a determination or decision is made whether or not the crank angle is in a suitable timing for performing the ignition operation prior to the ignition, in accordance with the output signals from the crank angle sensor 1 and the cylinder identifying sensor 38 through the wave shaping circuit 47.

If the result of the decision is NO, that is, it is not the suitable timing for performing the ignition operation, the operation of the subroutine terminates without performing the subsequent operations. However, if the result of the decision is YES, i.e. it is the timing for the ignition operation, the operation now moves to the next step 62.

In the step 62, the number of the current engine speed NE is detected in accordance with the signal from the crank angle sensor 1, and the operation now moves to the next step 63. In the step 63, a decision is made whether or not the current engine speed NE is above a previous weighting averaged engine speed $NE_{i-1}$ which was detected and which has been stored in the RAM 43 after its being subject to the averaging processing.

If the result of the decision is YES, that is, the value NE is above the value of $NE_{i-1}$, the operation now moves to the next step 64. However, if the result of the decision is NO, i.e. the value NE is below the value $NE_{i-1}$, the operation moves to the step 69.

In the step 64, a new weighting averaged value $NE_i$ is calculated in accordance with the value NE and the old weighting averaged value $NE_{i-1}$ which has been already stored in the RAM 43 by the following equation.

$$NE_i = NE_{i-1} + \frac{NE - NE_{i-1}}{12}$$

This weighting averaged value $NE_i$ is transferred to the RAM 43 and it is replaced with the value $NE_{i-1}$ and the renewal or updating of the weighting averaged value is carried out. After this operation, the operation now moves to the next step 65.

In the step 65, the difference $\Delta NE$ between the value NE and the value $NE_i$ is calculated by the following equation;

$$\Delta NE = NE - NE_i.$$

After completing this calculation, the operation moves to the next step 66. In the step 66, a correction amount or a delay angle amount $\Delta\theta$ for correcting the spark advance angle of the crank angle (delay angle) is calculated by the following equation;

$$\Delta\theta = C \times \Delta NE$$

(where C indicates a predetermined constant).

After this calculation, the operation now moves to the next step 67. In the step 67, the basic spark advance angle value $\theta_{base}$ is calculated in accordance with the current driving conditions, such as the temperature of the engine cooling water, engine load, etc. and from the calculated results of this basic spark advance angle value $\theta_{base}$ and of the delay angle amount $\Delta\theta$ which was sought in the step 66, the effective spark advance angle value $\theta$ is calculated by the following equation;

$$\theta = \theta_{base} - \Delta\theta.$$

In this case, the effective spark advance angle value $\theta$ implies a spark advance angle where the ignition is practically carried out. After this calculation, the operation now moves to the next step 68.

In the step 68, the output timing of the ignition current to be applied to the spark plug 2 (see FIGS. 1 and 2) is controlled in accordance with the effective spark advance angle value $\theta$ thus calculated in the step 67. The control signal for controlling the ignition current, which is produced from the CPU 41, is applied to the igniter 35 through the output port 49 and the driving circuit 51, and the operation of this subroutine terminates.

On the other hand, when the engine speed NE is below the weighting averaged value $NE_{i-1}$ in the step 63, the operation moves to the step 69, the value NE which was read in the step 62 becomes the value $NE_i$ and the operation moves to the next step 70. In the step 70, the delay angle amount $\Delta\theta$ is made to zero. After this processing or operation, the operation now moves to the next step 67, where the effective spark advance angle value $\theta$ is calculated as already dscribed in the foregoing.

After this calculation, the operation now moves to the next step 68. In the step 68, the ignition operation as described in the foregoing is performed and the operation of the subroutine terminates.

Figure 5:
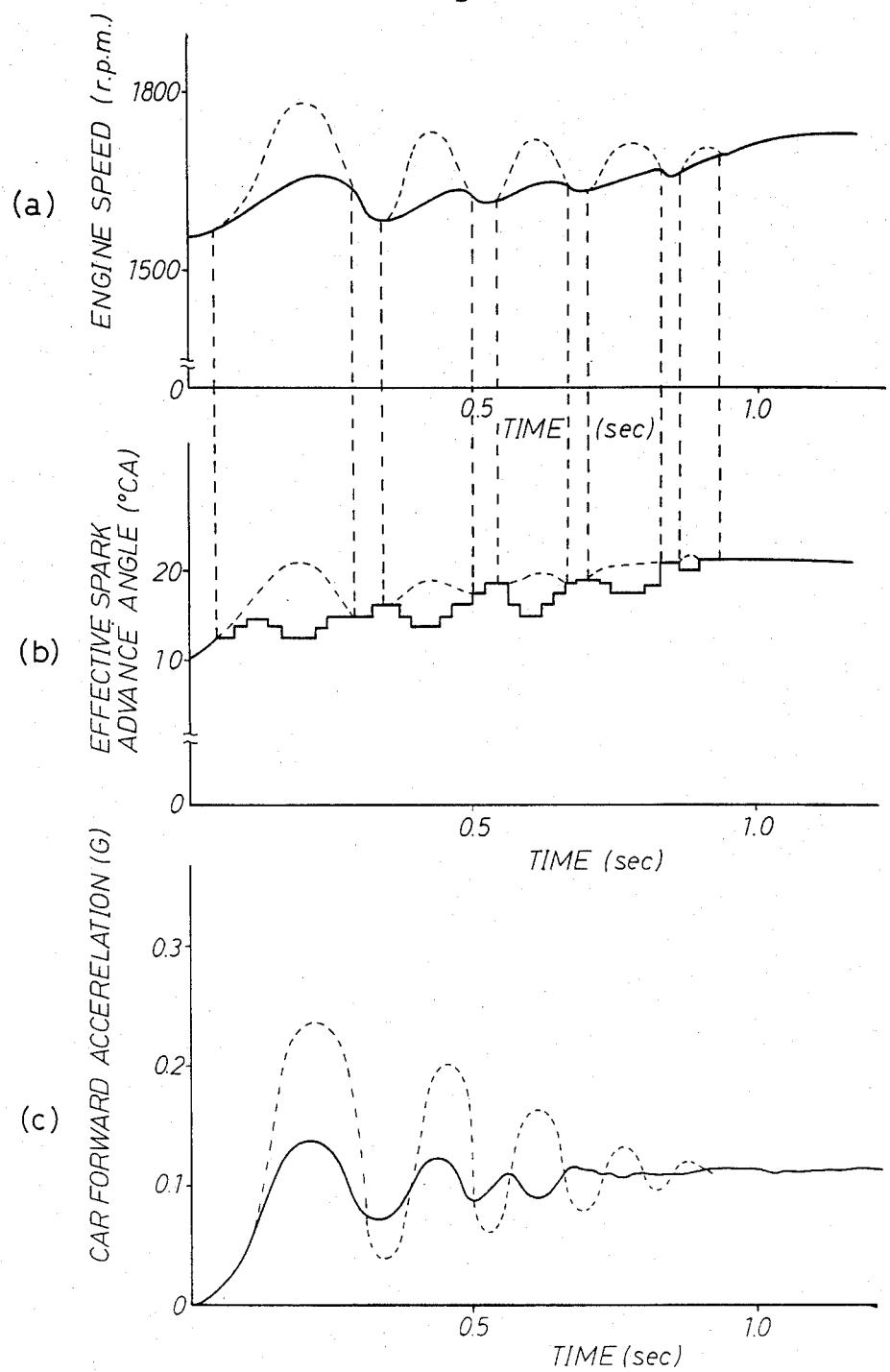
FIG. 5(a) illustrates a graph showing changes in the engine speed versus the time elapsed for the ignition timing control at the time of abrupt acceleration or deceleration, for comparing the first embodiment according to the present invention with the prior art.
FIG. 5(b) illustrates a graph of the effective spark advance angle value versus the time elapsed in accordance with change in the engine speed, for comparing the present invention with the prior art.
FIG. 5(c) illustrates a graph of car forward acceleration versus the time elapsed in accordance with changes in the engine speed and in the effective spark advance angle value.

As a result of the execution of the control program of the first embodiment according to the present invention, the engine speed by the adjustment of the spark advance angle of the engine is shown in FIG. 5(a) by the solid line in the present invention, whereas the dotted line indicates the engine speed according to the prior art.

FIG. 5(b) indicates a graph of the effective spark advance angle versus the time elapsed in accordance with change in the engine speed, as shown by the solid line by the adjustment the delay angle amount $\Delta\theta$ in the present invention, whereas the dotted line also indicates the effective spark advance angle value according to the prior art.

FIG. 5(c) shows the change in the car forward acceleration versus the time elapsed has been improved in the present invention as shown by the solid line by the adjustment of the ignition timing in the present invention, from the curve shown by the dotted line according to the prior art.

Figure 6:
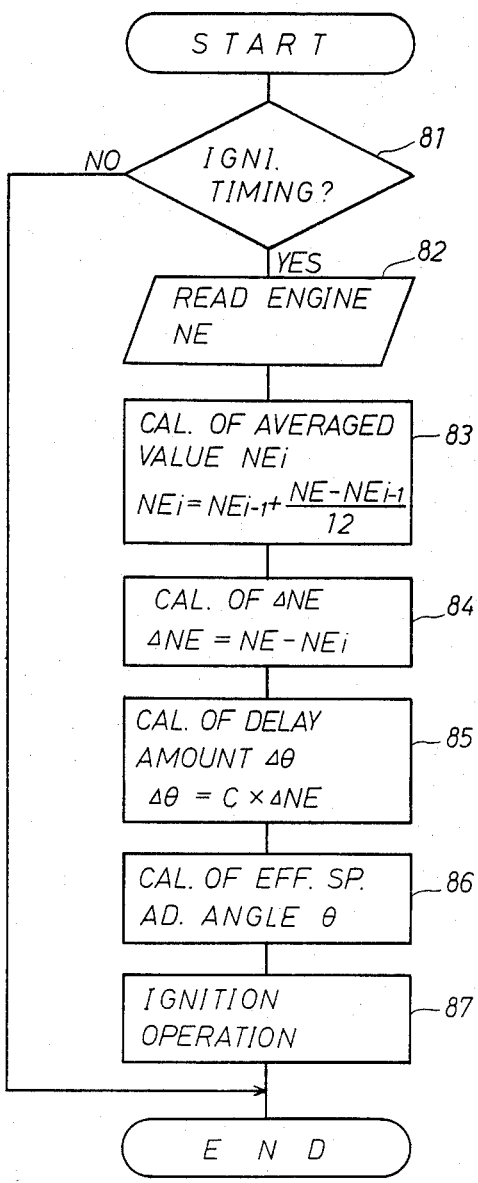
FIG. 6 illustrates a control program flow chart of a second embodiment according to the present invention for carrying out various operations and calculations.

Next, another control program flow chart of a second embodiment according to the present invention will now be described with reference to FIG. 6 which is more simplified than that of the first embodiment described and shown in the foregoing. The subroutine shown in FIG. 6 is repeatedly executed by the operational control unit 3 shown in FIG. 3, similarly, so as to carry out operations, in accordance with the timing signals produced by the timing generating circuit 50 for every thirty degrees.

First of all, when the operation starts, the step 81 is executed, where a first determination or decision is made if the crank angle is in a suitable timing for the ignition in accordance with the signals produced from the crank angle sensor 1, and from the cylinder identifying sensor 38, through the wave shaping circuit 47. If the result of the decision is NO, that is, it is not yet good timing for the ignition operation, the operation of this subroutine terminates.

However, if the result of the above decision is YES, i.e. it is now the timing for the ignition operation, the operation now moves to the next step 82. In the step 82, the current engine speed NE is detected in accordance with the signal from the crank angle sensor 1. After this operation has been finished, the next step 83 is to be executed. Namely, in the step 83, a new weighting averaged engine speed $NE_i$ is calculated by the following equation, in accordance with the old weighting averaged engine speed $NE_{i-1}$ as an averaged out value which has been already stored in the RAM 43 together with the engine speed NE which was detected in the previous step 82;

$$NE_i = NE_{i-1} + \frac{NE - NE_{i-1}}{12}$$

The value $NE_i$ thus calculated is applied to the RAM 43, where the old average $NE_{i-1}$ is replaced by the $NE_i$, thus carrying out the update operation of the weighting average. After this calculation, the operation now moves to the next step 84. In the step 84, the difference $\Delta NE$ between the both values of NE and $NE_i$ is calculated by the following equation;

$$\Delta NE = NE - NE_i.$$

In this case, the difference can be either positive or negative. After this calculation, the operation moves to the next step 85, where the amount to be corrected, i.e. the correction amount $\Delta\theta$ for correcting the spark advance angle is calculated by the following equation;

$$\Delta\theta = C \times \Delta NE.$$

After executing this operation, the operation now moves to the step 86. In the above equation, C indicates a predetermined constant.

In the step 86, the basic spark advance angle value $\theta_{base}$ is calculated in accordance with the parameters such as the water temperature for the engine cooling and the engine load which are representative of the current running conditions and the effective spark advance angle value $\theta$ is calculated by the $\theta_{base}$ thus calculated, from the following equation;

$$\theta = \theta_{base} - \Delta\theta.$$

That is, the effective spark advance angle value $\theta$ is calculated from the basic spark advance angle value $\theta_{base}$ by subtracting the correction amount $\Delta\theta$ which was sought in the previous step 85. In this case, if the correction amount $\Delta\theta$ is negative, the value $\theta$ is more advanced. After this calculation, the operation now moves to the next step 87.

Namely, in the step 87, the ignition operation is carried out in accordance with the effective spark advance angle value $\theta$ which was sought in the previous step 86. In this case, the control signal for controling the ignition current to be applied to the igniter 35 is produced from the CPU 41 and it is applied to the igniter 35 through the output port 49 and the driving circuit 51 and the actual ignition is carried out. After this operation, all the operations of the subroutine program terminate. When executing the control program of the second embodiment according to the present invention, the operational control unit 3 as shown in FIG. 3 can be used, similarly as in the case of the first embodiment.

Figure 7:
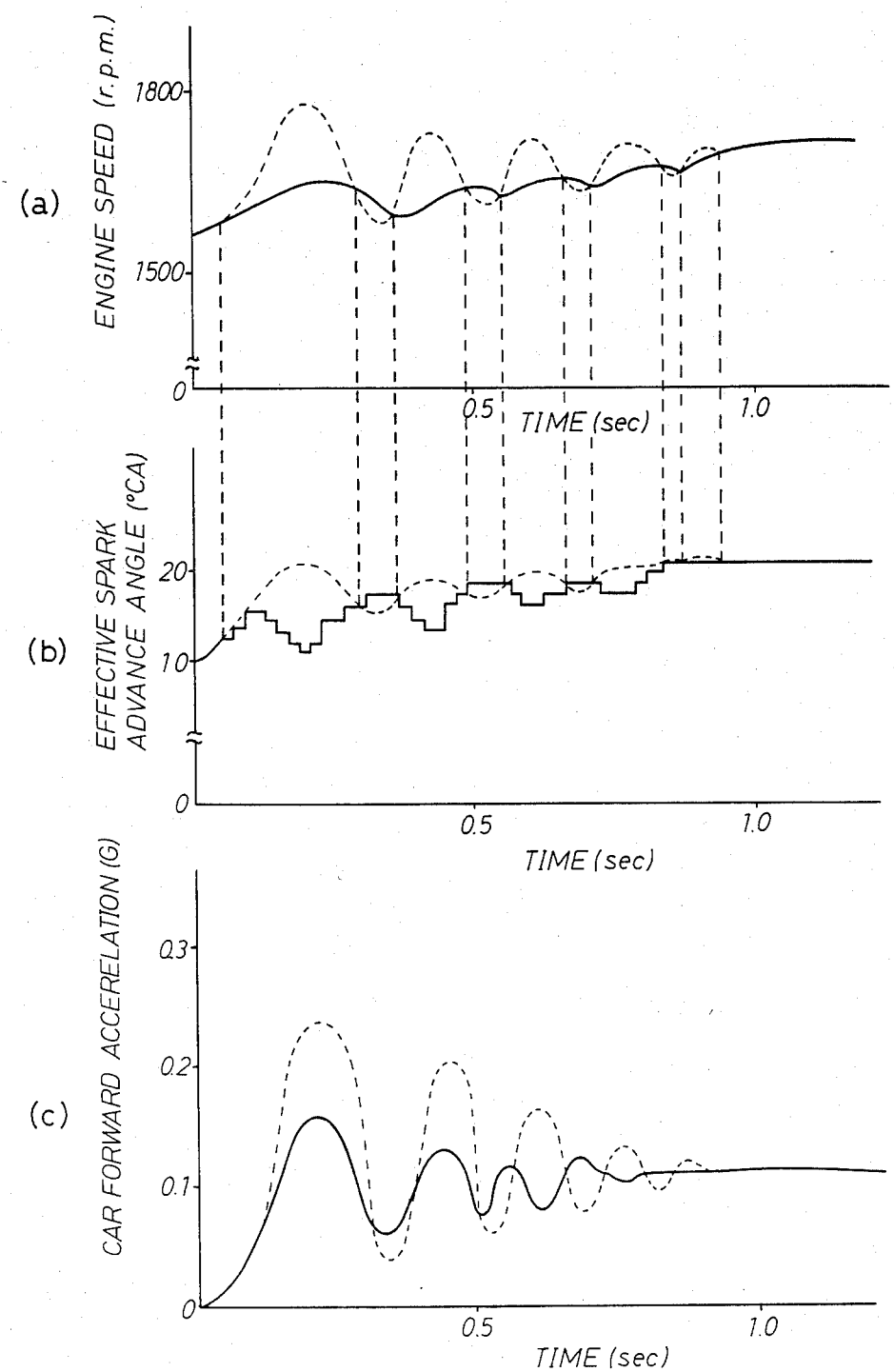
FIG. 7(a) illustrates a similar graph of the engine speed versus the time elapsed, associated with the second embodiment.
FIG. 7(b) illustrates a similar graph of the effective spark advance angle versus the time elapsed, associated with the second embodiment.
FIG. 7(c) illustrates a similar graph of the car forward acceleration versus the time elapsed, associated with the second embodiment according to the present invention, for comparing the present invention with the prior art, respectively.

FIG. 7(a) shows characteristic curves of the engine speed versus the time elapsed indicated both by the solid line and the dotted line. The solid line indicates the engine speed according to the present invention in which the engine speed has been corrected by the adjustment of the ignition timing, whereas the dotted line indicates the engine speed according to the prior art.

FIG. 7(b) shows a graph of effective spark advance angle value versus the time elapsed according to the present invention and the prior art as indicated by both the solid and dotted lines, respectively. Namely, in FIG. 7(b), the effective spark advance angle value $\theta$ which was corrected by the averaged engine speed according to the present invention changes stepwise as indicated by the solid line, whereas that of the prior art without the correstion changes as indicated by the dotted line.

FIG. 7(c) shows a graph of car forward acceleration versus the time elapsed according to the present and the prior art. Namely, in FIG. 7(c), the solid line indicates the car forward acceleration according to the present invention in which the amplitude in fluctuation is somewhat large as compared with that in the first embodiment according to the present invention, but it proves itself how the improvement has been made in this embodiment, whereas the dotted line indicates the car forward acceleration without the adjustment of the ignition timing, according to the prior art.

In the embodiments, the equation for realizing the averaging operation or processing in the steps 64 and 83 in the control program flow charts may be replaced by other possible equations for performing the averaging operation without being limited to the frame or scope of the embodiments according to the present invention.

As described in the foregoing embodiments according to the present invention, an over or excessive control of the ignition timing due to the fluctuation in the engine speed can be prevented by the averaging processing of the engine speed and a suitable control for the ignition timing becomes possible.

As a result, a smooth rising edge or leading edge of the torque of a car is realized at the time of abrupt acceleration or deceleration and shocks and "hiccups" which occur at the time of the abrupt acceleration or deceleration can be reduced, thus improving the drivability of the car.

Moreover, as described in the foregoing embodiments, the ignition timing control unit for a motor vehicle engine according to the present invention is constructed in such a manner that the value of the spark advance angle is corrected in accordance with the difference between the averaged value of the engine speed and current engine speed and the output timing of the ignition current to be applied to the spark plug is controlled in accordance with the value of the spark advance angle thus corrected.

With this construction according to the present invention, an over or excessive control condition of the ignition timing due to the fluctuation, because of the backlash in the gears in the drive system and the twisting of a propeller shaft due to the change in the torque at the abrupt acceleration or deceleration of the engine or the change in the engine speed due to the deformation of a tire or tires can be prevented and the rising edge of the torque can be smoothed, thus reducing the shocks and hiccups which will otherwise occur at the time of the abrupt acceleration or deceleration and also enabling the drivability of the car to be improved.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. An ignition timing control unit for a car engine which comprises an operational control circuit for controlling the output timing of ignition current to be applied to a spark plug in accordance with a crank angle signal produced for every equal crank angle in synchronization with the rotation of a crank shaft; said operational control circuit further comprising;
    (a) engine speed detecting means for detecting the engine speed in accordance with the crank angle signal,
    (b) memory means for storing averaged values of the engine speed,
    (c) basic spark advance angle calculating means for calculating a basic spark advance value from running conditions of the engine,
    (d) averaging means for newly carrying out an averaging process in accordance with the engine speed and an averaged value of the engine speed and afterward storing the result of the averaging process into said memory means as one averaged value of the engine speed and for updating said average value of the engine speed which has been stored in said memory means, and
    (e) calculating means for calculating an amount to be corrected of the spark advance angle in accordance with the difference between the averaged out value and the engine speed and for controlling the output timing of the ignition current in accordance with the amount thus corrected of the basic spark advance angle value by said amount to be corrected.

2. A method for controlling an ignition timing for a car engine by use of a microprocessor having a ROM and a RAM, which comprises the steps of:

(a) determining whether or not a crank angle is in the suitable timing for the ignition control in accordance with the signals from the crank sensor and from a cylinder identifying sensor;
(b) detecting the current engine speed and storing the data corresponding to the engine speed in a memory, as the result of the first determination;
(c) determining whether or not the current engine speed NE detected above is larger than a weighting averaged value $NE_{i-1}$ which was detected previously and which has been stored in the memory of the microprocessor;
(d) updating the old weighting averaged value $NE_{i-1}$ stored in the memory with a new weighting averaged value $NE_i$ by detecting new current engine speed NE as the result of the second determination;
(e) calculating the difference $\Delta NE$ between said new averaged out value $NE_i$ and the current engine speed NE and calculating a delay angle amount $\Delta\theta$ to be corrected for the spark advance angle of a crank angle by the following equation;

$$\Delta\theta = C \times \Delta NE$$

(where C indicates a constant)
(f) calculating an effective spark advance angle value $\theta$ by the following equation;

$$\theta = \theta_{base} - \Delta\theta$$

after calculating a basic spark advance angle value $\theta_{base}$ in accordance with current running conditions of the engine e.g. engine cooling water temperature, engine load;
(g) controlling the output timing of ignition current to be applied to a spark plug in accordance with the effective spark advance angle value $\theta$ thus calculation.

3. A method as set forth in claim 1 wherein it further comprises the step of making the delay angle amount $\Delta\theta$ to be zero, after updating the old weighting averaged value $NE_{i-1}$ stored in the memory with the current engine speed NE detected this time.

4. A method for controlling an ignition timing for a car engine by use of a microprocessor having a ROM, and a RAM, which comprises the steps of:
(a) determining whether or not the crank angle is in a suitable timing for the ignition control in accordance with the signals from the crank angle sensor and from the cylinder identifying sensor;
(b) detecting the current engine speed and storing the data corresponding to the engine speed in a memory, as the result of the first determination;
(c) updating the old averaged value stored in the memory with a new weighting averaged value $NE_i$ by detecting new current engine speed NE, as the result of the second determination;
(d) calculating the difference $NE_i$ and the current engine speed NE and calculating a delay angle amount $\Delta\theta$ to be corrected for the spark advance angle of the crank angle by the following equation;

$$\Delta\theta = C \times \Delta NE$$

(where C indicates a constant)
(e) calculating an effective spark advance angle value $\theta$ by the following equation;

$$\theta = \theta_{base} - \Delta\theta$$

after calculating a basic spark advance value $\theta_{base}$ in accordance with current running conditions of the engine, e.g. engine cooling water temperature, engine load, etc; and (f) controlling the output timing of, the ignition current to be applied to the spark plug in accordance with the effective spark advance angle value $\theta$ thus calculated.

5. An ignition timing control unit for a car engine which comprises a microprocessor, and a plurality of sensors such as an air flow meter, a engine cooling water temperature sensor, a crank angle sensor, and a cylinder identifying sensor, etc;

said microprocessor further comprising;
- a central processing unit (CPU) for carrying out various calculations and operations,
- a random access memory (RAM) for storing various data detected by said sensors,
- a read only memory (ROM) into which various control programs have been stored in advance,
- a multiplexer for passing one signal at a time among multiple input signals received at its input and
- an analog to digital converter (A/D converter) coupled to the output of said multiplexer for converting input analog signals into digital signals, whereby various operations and calculations such as averaging out calculation of the engine speed, basic spark advance angle value calculation, effective spark advance angle value calculation are carried out by the use of the microprocessor and the output timing of the ignition current to be applied to the spark plug is timely controlled.

6. An ignition timing control unit for a car engine as set forth in claim 5 wherein at least any one of the corresponding control programs for realizing the method having the steps as set forth in claims 2, 3 and 4 has been stored in said ROM in advance.

* * * * *